Figure 3:
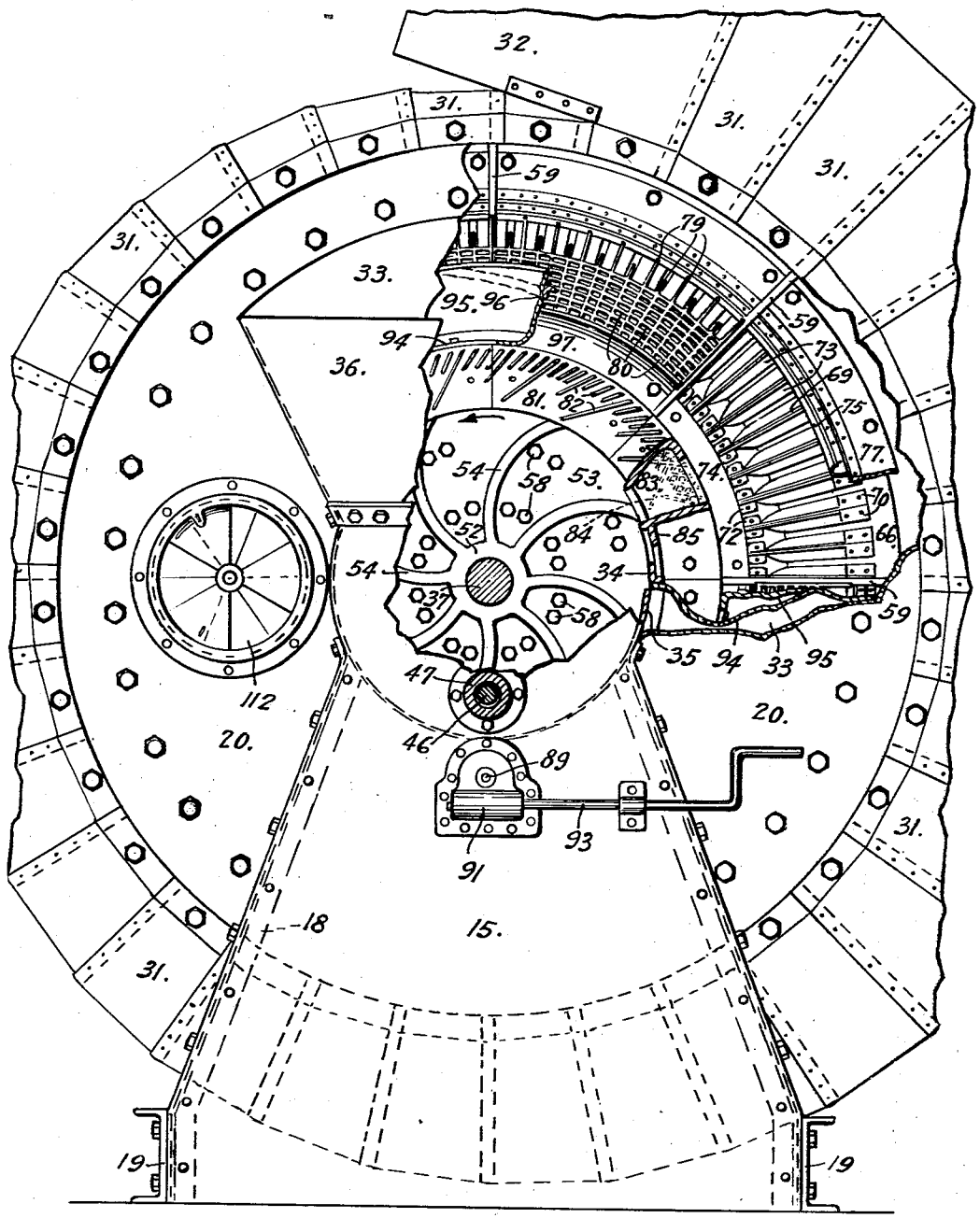

Feb. 2, 1937.  E. E. METCALF  2,069,735
GRAIN SEPARATOR AND THRESHER
Filed Oct. 2, 1933  4 Sheets—Sheet 1
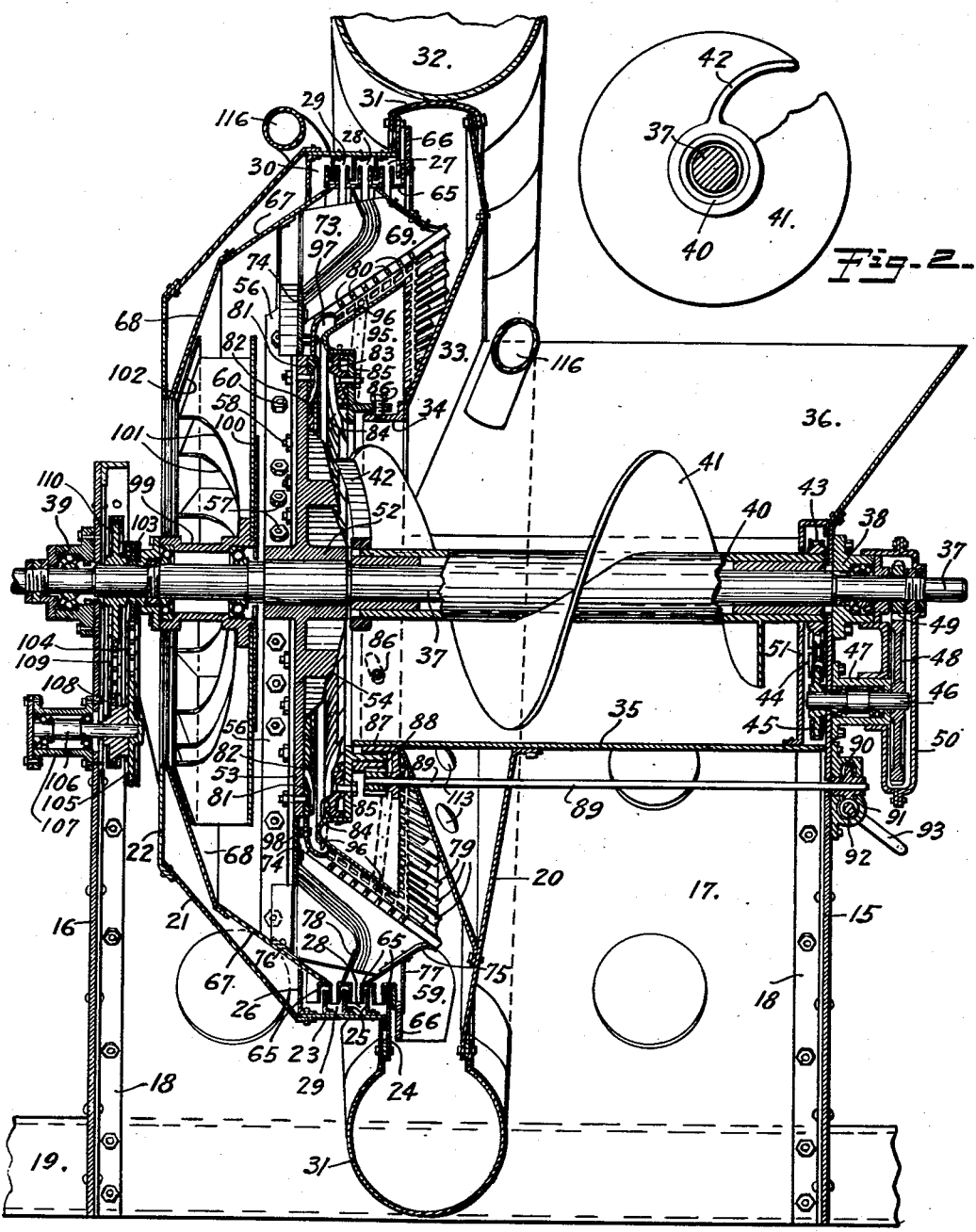
INVENTOR:
E. E. METCALF
BY
David O. Barnell, ATTORNEY Feb. 2, 1937. E. E. METCALF 2,069,735
GRAIN SEPARATOR AND THRESHER
Filed Oct. 2, 1933 4 Sheets-Sheet 3
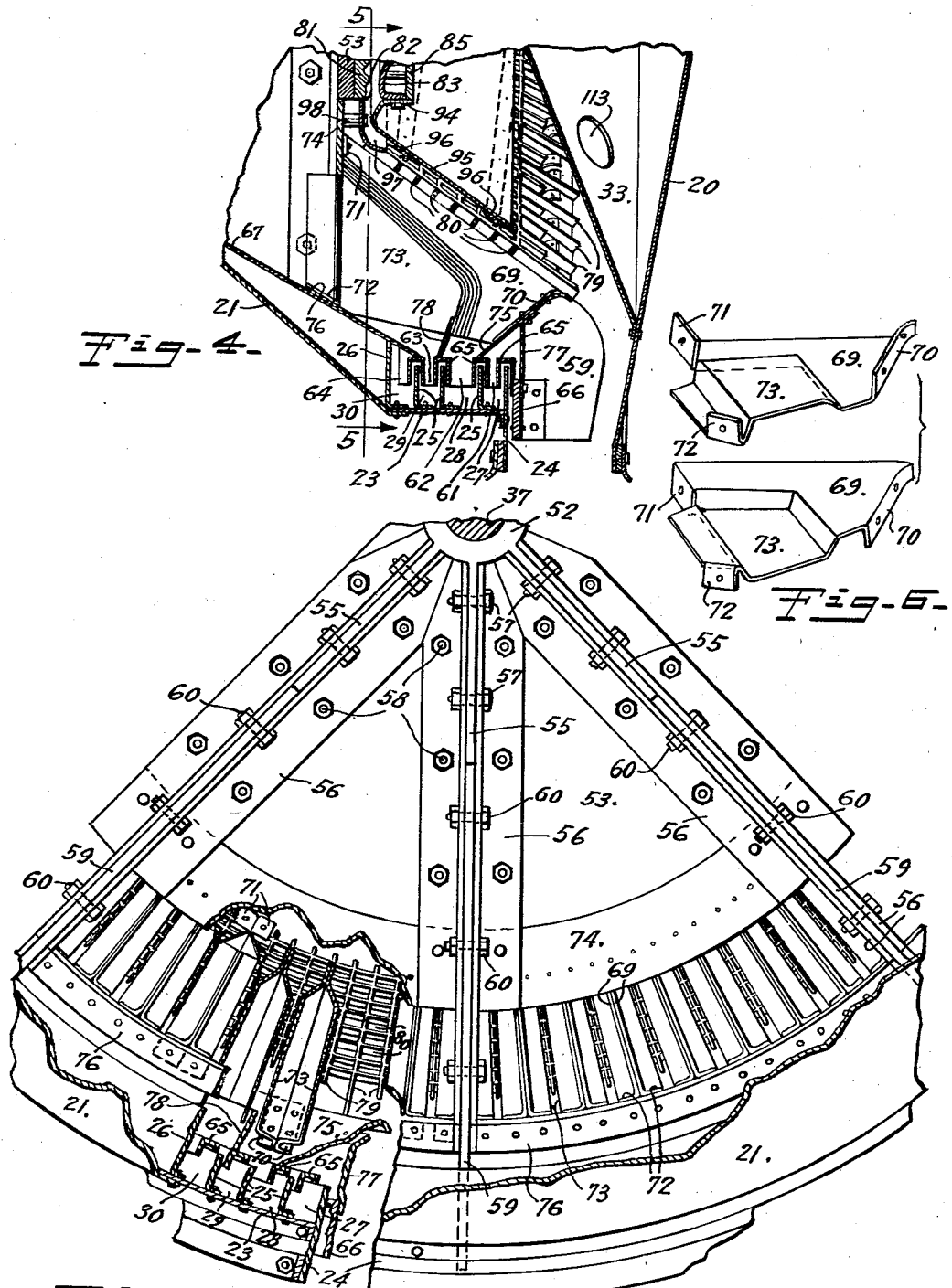
INVENTOR:
E. E. METCALF
BY
David O. Barnell, ATTORNEY

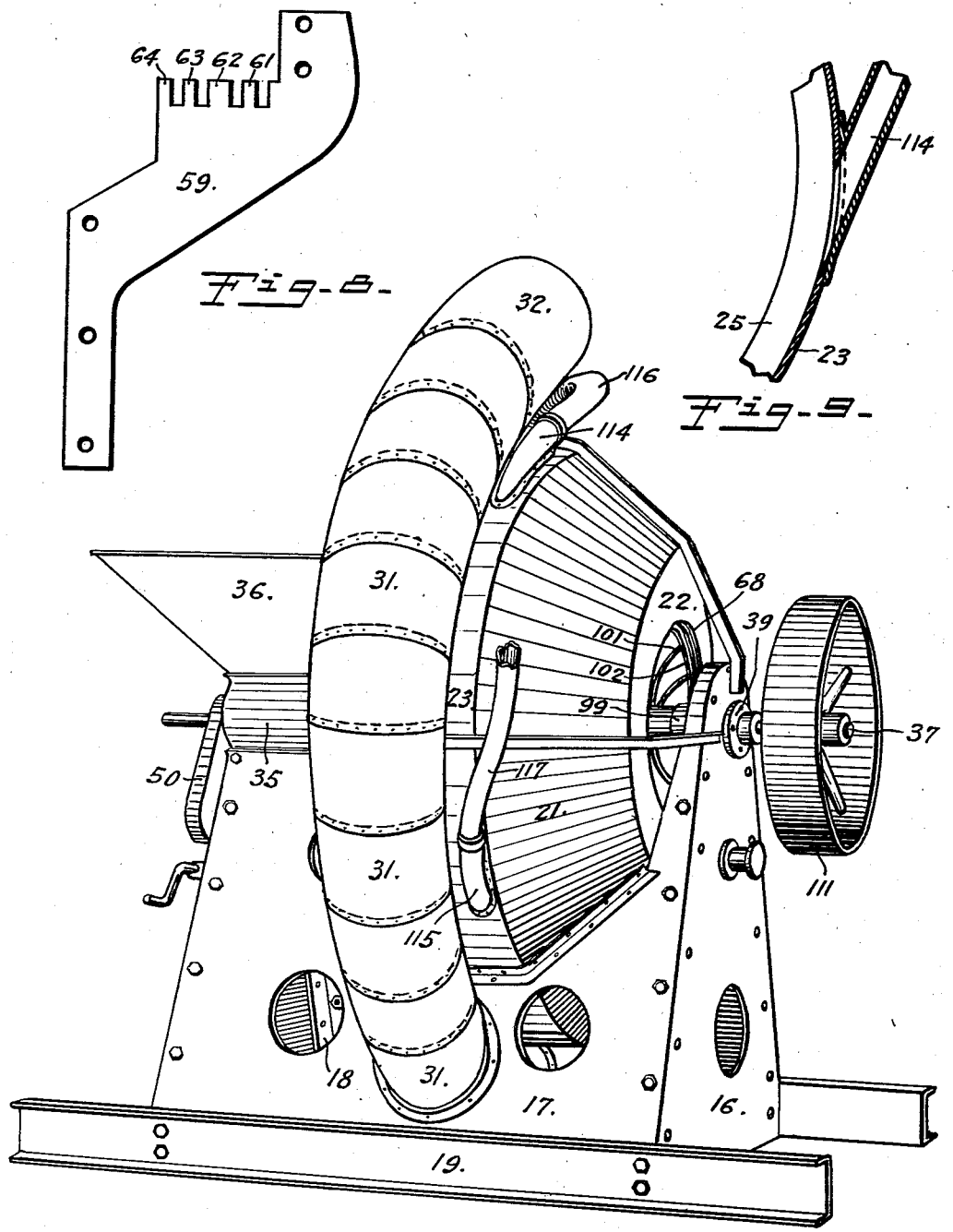

Patented Feb. 2, 1937

2,069,735

UNITED STATES PATENT OFFICE 2,069,735

GRAIN SEPARATOR AND THRESHER

Edgar E. Metcalf, Moville, Iowa

Application October 2, 1933, Serial No. 691,797

12 Claims. (Cl. 130—27)

My invention relates to grain separating and threshing machines. It is the primary object of my invention to provide a grain separator which is operable independently of gravitational forces, whereby its operation is substantially unaffected by tilting or change of position of the mechanism relative to a horizontal plane. A further object is to provide a grain separator which is operable at varying speeds without substantially affecting the efficiency thereof, and which has a large capacity proportional to its size and weight. A further object of my invention is to provide a grain separator employing centrifugal instead of gravitational forces for impelling the threshed material, while subjecting the same to the action of a screen and of controlled air-currents, whereby the straw and chaff, the tailings or imperfectly threshed material, and the clean grain, are caused to move in different paths to separate collecting-channels therefor. A further object of my invention is to provide a combined grain threshing and separating mechanism wherein the moving parts of the threshing means; of the means for delivering the threshed material to the separating mechanism, distributing said material thereon and impelling the same therein; and of the means for discharging the straw and chaff, delivering the grain, and returning the tailings to the threshing means, are all combined in a single rotor or element mounted fixedly upon a main shaft and revolving therewith about the shaft-axis. A further object of my invention is to provide grain threshing and separating mechanism especially adapted to use in combines. Particular objects of my invention, relating to specific structure and arrangement of parts, for performing the several functions involved in the operation of the mechanism as a whole, will be pointed out hereinafter.

In the accompanying drawings Fig. 1 is a longitudinal vertical section of a machine embodying my invention, Fig. 2 is a detail end view of the feed-worm and distributing-blade, Fig. 3 is a front end elevation of the machine, with successive portions of the housing and other parts broken away to show the more remote portions, Fig. 4 is an enlarged detail of a fragment taken from Fig. 1, Fig 5 is a rear view of a portion of the rotor and housing, with portions broken away to show some of the screen-plates in transverse section on the line 5—5 of Fig. 4, Fig. 6 is a perspective view of a pair of the screen-plates, separated to show the specific formation thereof, Fig. 7 is a perspective view of the entire machine, Fig. 8 is a detail side view of one of the main impeller-blades of the rotor, and Fig. 9 is a detail section through one of the discharge-nipples from the collecting-channels in the housing.

In carrying out my invention according to the illustrated embodiment thereof, I provide a rigid frame structure comprising vertical front and rear end-plates 15 and 16, of which the upwardly convergent lateral edges are joined by side-plates 17 connected therewith by interiorly arranged angle-bars 18 secured to the plates, as shown. At the lower longitudinal edges of the box-like frame structure are secured the channel-beams 19 which are extended beyond the end-plates and form a base for the machine. The side-plates 17 of said frame structure are intersected transversely by the lower portion of the rotor-housing, which comprises a front frusto-conical member 20, a rear frusto-conical member 21, and a cylindrical member 23 extending forwardly from the front edge of the member 21. The front edge of the member 23 is flanged outwardly, and to the flange is affixed an annular plate 24, which is spaced from the rear edge of the front housing-member 20, and has substantially the same outside diameter as said member 20. The inside diameter of the annular plate 24 is less than the diameter of the member 23, whereby the inner portion of said plate 24 constitutes an annular flange extending inwardly from the front edge of the cylindrical member 23. Upon the inside of said member 23 are secured a plurality of L-rings 25 and a single L-ring 26, the latter being rearward of the former and being of smaller internal diameter, and there being formed, between the plate 24 and the successive L-rings, a plurality of annular channels 27, 28, 29 and 30, each open at its inner side. To the outer edges of the front housing-member 20 and of the plate 24 there are secured in straddling relation a plurality of C-shaped plates 31, of progressively increasing diameter, having their adjoining ends overlapped and secured together to form a snail-like conduit extending continuously about the rotor-housing and communicating with the annular opening between said plate 24 and member 20. At its larger end said conduit is continued tangentially of the housing by cylindrical tubular sections 32. Affixed to the rear or inner side of the housing-member 20 is a frusto-conical plate 33 of which the conical inclination is greater than and opposite in direction to that of the member 20. To the annular inner edge of said plate 33 is affixed an L-ring 34, which constitutes the feed-throat of the housing. Fitting within the lower portion of said L-ring 34 and extending forwardly therefrom to the front end-plate 15, is the feed-trough 35, which is of cylindrosegmental formation, and to the upper edges of said feed-trough is affixed the lower portion of the feed-hopper 36, said hopper being extended rearwardly to the plate 33, and the member 20 being cut away across the top of the hopper, except outwardly from the edge of the plate 33, so that the latter forms in effect a rear end for the hopper. The main-shaft 37 extends horizontally, in concentric relation with the rotor-housing and feed-trough, said shaft being journaled in suitable bearings 38 and 39 affixed respectively to the front and rear end-plates 15 and 16 of the frame. Mounted revolubly upon the main-shaft 37 within the feed-trough is a sleeve 40 upon which is affixed the feed-worm 41, comprising a helical blade having a pitch such as to encircle the sleeve once or more within the length thereof. At its rear end the blade of the feed-worm unites with a spirally-shaped flange 42 of which the transverse elements are parallel with the shaft-axis, said flange extending beyond the helical portion of the blade, as shown in Figs. 1 and 2. At the front end of the sleeve 40 a sprocket-wheel 43 is secured thereon, and from said sprocket-wheel a chain 44 extends about a sprocket-wheel 45 carried on the rear end of a short counter-shaft 46. Said counter-shaft 46 is journaled in a bearing 47 carried by the front end-plate 15, and at the front end of the shaft 46 is carried a gear 48 which meshes with and is driven by a pinion 49 on the main-shaft 37. The pinion 49 and gear 48 are inclosed by a suitable housing 50, and the sprocket-wheels 43 and 45, and chain 44, also have an inclosing housing 51. The arrangement of the driving means therefor is such that the sleeve 40 and feed-worm 41 revolve in a clockwise direction as viewed from the front end thereof, while the main-shaft 37 revolves in a counter-clockwise direction and at a higher speed than the feed-worm.

Upon the main-shaft 37, immediately adjoining the rear end of the feed-worm-sleeve 40, there is affixed the hub 52 which forms the central supporting part of the rotor or moving element of the centrifugal separating and threshing mechanism. A circular plate 53 is formed integrally with and extends out from the hub 52, said plate having on the front side thereof a plurality of spiral ribs 54, and having on the rear side thereof a plurality of radial ribs 55. For each of said ribs 55 there is a pair of angle-bars 56 disposed at the sides of the rib and secured thereto by bolts 57, the lateral flanges of said angle-bars lying against the plate 53 and being secured thereto by bolts 58. The angle-bars 56 are extended radially beyond the periphery of the plate 53, and the lateral flanges of said bars, which are parallel with said plate, are removed from the outer portions of the bars, so that said outer portions consist only of the flanges which extend longitudinally of the rotor-axis. Between the pairs of angle-bars 56, and extending out from the ends of the ribs 55, are the shank portions of the main impeller-blades 59, which are secured between the bars by bolts 60 extending through the parts, as shown. From the shank portions thereof the body portions of the blades extend forwardly and outwardly, the inner edges of the blades being oblique to the rotor-axis, and said edges rounding outwardly at the front ends, adjacent to the outer portions of the conical housing-plate 20, so that the outer terminal portions of the blades extend into the annular space between said plate 20 and the annular plate 24. Rearwardly of said terminal portions of the blades, the outer edges thereof are rectangularly notched to receive the inner edges of the plate 24 and L-rings 25, so that between said notches there are formed rectangular tongues 61, 62, 63 and 64, extending respectively into the channels 27, 28, 29 and 30. Continuous U-rings 65, extending through the rectangular notches of the several blades 59, straddle the inner edges of the plate 24 and L-rings 25, and a continuous flat ring 66 is affixed to the rear edges of the terminal portions of the blades, adjacent to the annular plate 24 of the housing. A frusto-conical shroud-plate 67 is secured to the outer ends of the angle-bars 56 and extends convergently rearward therefrom, the larger or front end of said plate 67 being notched to extend between the rear portions of the blades 59 into engagement with the rear U-ring 65. To the rear portion of the plate 67 is secured the front end of a frusto-conical shroud-extension plate 68, having flatter conical inclination than the plate 67, the opening or aperture at the rear end of said extension-plate 68 being close to and registering with the central aperture of the rear housing-member 22. The hub 52, plate 53, angle-bars 56, blades 59, and rings 65 and 66, comprise the main frame of the rotor, to which the impeller-screen is secured in sector-units, each fitting between an adjacent pair of the blades 59. The impeller-screen is formed principally by a plurality of sheet-metal plates 69, arranged in oppositely disposed pairs, of which one pair is shown in a separated relation in Fig. 6. The general form of the screen-plates is trapezoidal, each plate having a lateral flange 70 at its front edge, flanges 71 and 72 at its rear edge adjacent respectively to the inner and outer corners thereof, and a laterally swaged or offset trapezoidal portion 73 adjacent to the rear and outer edges of the plate, said flanges 70, 71 and 72, and the offset portions 73, extending oppositely on the plates of each pair, which are disposed with the flat bodies thereof in contact with each other. In each sector-unit of the impeller-screen, a plurality of the pairs of plates 69 are assembled and connected with each other by means of a flat ring-sector 74 with which the flanges 71 are engaged, a conical ring-sector 75 with which the flanges 70 are engaged, and a conical ring-sector 76 with which the flanges 72 are engaged, the respective ring-sectors and flanges of the plates being secured together by riveting, welding, or other suitable means. In each screen-sector the plates 69 extend radially to the axis of the ring-sectors, so that adjacent pairs of the plates are slightly divergent toward their outer edges, but the offset portions 73, which project laterally from both sides of each contacting pair of the plates, are swaged out farther at the outer edges than at the inner edges thereof, whereby in the assembled screen-structure the opposed surfaces of the portions 73 on successive pairs of the plates are uniformly spaced apart. On each screen-sector, in addition to the ring-sectors 74, 75 and 76, there is a flat ring-sector 77 which is secured to the sector 75 and is substantially parallel with the sector 74, and a conical ring-sector 78 arranged between the sectors 75 and 76 at the outer edges of the screen-plates, said sector 78 being notched at its inner edge to extend in between the offset plate-portions 73. In assembling the screen-sectors upon the rotor-frame, the ring-sectors 74 are engaged with and secured to the lateral flanges of the angle-bars 56, adjoining and concentric with the outer edge of the plate 53, and the ring-sectors 77 are engaged with and attached to the ring 66, the ring-sectors 76 engaging interiorly the shroud-plate 67, and the ring-sectors 75 and 78 engaging respectively the U-rings 65 which straddle the front and intermediate L-rings 25. In the rotor assembly, the inner edges of the screen-plates 69 are in register with the oblique inner edges of the main impeller-blades 59, on a frusto-conical surface which extends forwardly and outwardly from the flat ring formed by the sectors 74. Inwardly of said frusto-conical surface there is carried upon the rotor a frusto-conical grating or cribriform structure comprising a series of bars 79 disposed radially edgewise to the rotor-axis and extending diagonally of said axis and substantially parallel with the adjacent inner edges of the blades 59 and plates 69, and a series of annular bars 80, intersecting transversely the several bars 79, so that between the intersecting parts of said bars there are formed annular series of substantially rectangular openings. On the front side of the plate 53, between the outer edge thereof and the outer ends of the spiral ribs 54, there are secured a plurality of arcuate plates 81, forming a continuous ring having upon the front side thereof the diagonal projecting ribs 82, best shown in Fig. 3. A coacting normally stationary ring-member is formed by a series of arcuate plates 83, having thereon diagonal ribs 84 arranged to extend transversely of the ribs 82, said plates 83 being secured upon the rear side of the radial flange of an L-ring 85, the axial flange of said L-ring fitting slidably about the axial flange of the L-ring 34. The latter carries a plurality of fixed studs 86 which extend through helical slots in the axial flange of the ring 85, and upon the lower portion of the latter flange there are provided a series of teeth 87 forming a gear-segment with which the teeth of a pinion 88 are in operative mesh. Said pinion 88 is carried upon the rear end of a small shaft 89 which is supported in a bearing upon the ring 34, and extends forwardly therefrom through the housing-plates 33 and 20, and the end-plate 15, the front end of the shaft being secured to a worm-gear 90 mounted rotatably in a casing 91 secured on the end-plate 15. The casing 91 incloses also a worm 92 which meshes operatively with the worm-gear 90, said worm having connected therewith a crank-shaft 93 extending beyond the adjacent side-plate 17, whereby the worm may be actuated to operate the worm-gear and the shaft 89. By rotation of said shaft and the pinion 88, the L-ring 85 may be rotated to adjusted positions relative to the ring 34, and by the co-action of the studs 86 with the helical slots in the axial flange of the ring 85, rotation of said ring causes it to move forward or back, thereby increasing or reducing the space between the plates 81 and 83. To the peripheral portions of the plates 83 is connected the cylindrical inner portion 94 of a retaining-ring or baffle, comprising a main frusto-conical outer portion 95 which is uniformly spaced from the adjacent inner portion of the rotor-grating formed by the bars 79 and 80, and of which the rear or inner part is curled inwardly and forwardly to unite integrally with the rear part of the cylindrical portion 94 which fits about the edges of the plates 83 and ring 85. Upon the conical outer surface of the ring-portion 95, there is secured one or more spirally extending angle-bars 96, of which the pitch or inclination is such that axially spaced turns or convolutions thereof about the member 95 are in overlapping relation to each other, the projecting flange of each bar 96 extending perpendicularly thereof into the space between the member 95 and the rotor-grating, and being close to but not touching the latter. A cupped guide-ring 97 is carried by the rotor, being connected by studs 98 with the ring-sectors 74, the inner edge of said ring 97 adjoining the peripheral edges of the threshing-plates 81, and the outer portion of said ring 97 being curved forwardly within the rear terminal portions of the grate-bars 79.

The shroud-plate 67 and extension 68 form, within the rotor rearwardly of the plate 53, a chamber in which is contained an auxiliary blower or fan, which is employed optionally, for increasing the force and volume of air driven through the separating means and delivery passages of the machine. Said auxiliary blower has a hub-member 99 which is mounted revolubly upon the main-shaft 37 behind the rotor-hub 52, said member 99 being flanged at its front end and the flange having secured thereto the flat circular shroud-plate 100, with which the front edges of the vanes 101 are connected. The rear edges of the vanes are concave from the hub outwardly to a frusto-conical shroud-plate 102, of which the central opening is substantially in register with the openings through the plate 68 and rear housing-member 22. To the rear end of the hub-member 99 is secured a sprocket-wheel 103 which is connected by a chain 104 with a sprocket-wheel 105 carried by a countershaft 106. Said countershaft is mounted revolubly in a bearing 107 carried by the rear end-plate 16 of the frame. A second sprocket-wheel 108 is secured on the counter-shaft and is connected by a chain 109 with a sprocket-wheel 110 secured on the main-shaft 37. The driving sprocket-wheels 105 and 110, being in each instance larger than the respective driven sprocket-wheels 103 and 108, the auxiliary blower is thereby driven at a substantially higher speed than the main-shaft 37 and the rotor which is affixed directly upon said shaft. The auxiliary blower is of relatively simple structure and may be easily balanced to insure coincidence of its center of gravity with its axis of rotation about the main-shaft 37, so as to operate smoothly and without vibration at any desired speed. Being so balanced or centered, the auxiliary blower tends by gyroscopic action to suppress vibration of the main-shaft should the rotor carried thereon not be in perfect balance about the shaft-axis, and the coaxial mounting of the rotor and auxiliary blower is thus contributory in effecting quiet and vibrationless operation of the mechanism as a whole. The main-shaft may be driven by a belt applied to the pulley 111 carried upon the portion of the shaft which projects from the rear bearing 39, and the feed-worm and auxiliary blower are driven from the main-shaft through the described counter-shaft connections, by which the blower is rotated in the same direction as and at greater speed than the main-shaft, while the feed-worm is rotated in the opposite direction from and at lower speed than the main-shaft. During operation of the machine a limited amount of air may be inducted to the rotor-housing through the feed-throat or opening through the ring 34, but the principal air-intake is the central opening through the rear end-plate 22 of the housing, and there is also an air-intake through an opening in the front plate 20, which is controlled by a rotatably adjustable sector-plate 112, shown in Fig. 3. Said air-intake opening communicates with the space between the plates 20 and 33, and from said space the air enters the front portion of the rotor-chamber through a plurality of openings 113 in the plate 33. Discharge of materials from the housing is effected through conduits extending tangentially from the periphery thereof, there being for this purpose a tangential nipple 114 communicating with the annular channels 27 and 28, and a tangential nipple 115 communicating with the channels 29 and 30, in addition to the large tangentially extending conduit 32, previously referred to, which connects with the tapering annular channel inclosed by the C-plates 31. To the nipple 114 is connected a flexible conduit 116, which is extended to discharge into the feed-hopper, and to the nipple 115 is connected a flexible conduit 117, which may be extended to discharge wherever desired.

Having considered in detail the structure of the various parts of the machine, the coaction or functioning thereof, to effect threshing and separating of grain, may be easily understood. First it will be seen that when the main-shaft is driven by the application of power to the drive-pulley 111, the front and outer terminal portions of the blades 59 of the rotor will act as impellers to drive air from the housing outwardly into the annular collecting-channel and through the discharge-conduit 32. Similarly, the tongues 61, 62, 63 and 64, acting as impellers in the respective channels 27, 28, 29 and 30, will cause the forcible expulsion of air and any entrained solids from said channels through the conduits 116 and 117. The material to be threshed is placed in the feed-hopper and is forced rearwardly through the feed-trough by the rotation of the worm 41. As the material passes through the feed-throat, or opening through the ring 34 at the rear end of the feed-trough, it becomes subjected to the joint action of the spiral ribs 54 on the rotor-plate 53 and of the spiral flange 42 on the rear end of the feed-worm, the curvature and direction of rotation of said ribs 54 and flange 42 being such that the material is thereby forced outwardly into the space between the ribbed threshing-plates 81 and 83. Upon entering said space the material continues to be impelled outwardly by the ribs 82, and is thereby dragged transversely across the ribs 84 of the stationary plates 83. The spacing of the plates 81 and 83 is adjusted by varying the position of the ring 85, through the operation of the parts 86, 87, 88, 89, 90, 92, and 93, as described, according to the kind and condition of the material being worked upon, it usually being preferable to set the ribbed plates close enough, but not closer than necessary, to assure effective threshing or loosening of the grain from the chaff and straw, so that the same may be subsequently separated. Emerging peripherally of the threshing-plates 81 and 83, the threshed material engages the cupped ring 97 and is thereby directed forwardly into the space between the conical retaining-plate 95 and the rotor-grating 79—80. In said space the rotation of the grating tends to sweep the material outwardly and forwardly across the conical surface, the movement of the material being controlled by the spiral ribs 96 on the retaining-plate 95, so that, while the material moves axially across the conical grating-surface, it is also constrained to remain thereon while the same moves circumferentially a definitely determined amount. The larger and more elongated pieces or portions of the threshed material, such as stems and straw, are retained within the rotor-grating, across which the material is spread and moves in a thin layer, so that the threshed or loosened grain has a maximum opportunity to pass outwardly through the openings of the grating, and into the radial passages between the pairs of screen-plates 69, while the straw moves axially forward to the front terminus of the grating and off the front ends of the bars 79 into the front portion of the rotor-chamber adjoining the housing-member 33, whence it is thrown outwardly into the collecting-channel and is air-borne therein to and through the discharge-conduit 32. Straw or elongated portions of material are directed by the cupped ring 97 to extend substantially parallel with the inner surface of the rotor-grating, being thereby inhibited from passing endwise through the openings thereof. The smaller particles or pieces of the threshed material, which pass into the opeinings of the rotor-grating, are positively driven by the bars 79 and are thereby moved outward radially by centrifugal force, to pass into the spaces between the impeller-plates 69 of the rotor-screen, by which the impulsion of the material is continued, so that the material tends to be thrown from the outer edges of said plates 69 into the outwardly convergent space between the members 67 and 75, and thereby directed into the collecting-channels 28 and 29 of the housing. While passing between the screen-plates 69, however, the material is subjected to a strong air-current which flows between said plates from the rear to the front portions thereof, the air being impelled partly by the main impeller-blades 59 and partly by the auxiliary blower inclosed in the chamber at the rear end of the rotor. Intake of air between the rear portions of the screen-plates is limited to the spaces between the offset portions 73, said spaces being stopped at their inner ends by the ring-sectors 74, and stopped at their outer ends by the ring-sectors 76. By the restriction of area of the air-passages between the screen-plates at the offset portions 73, the air is caused to move through the restricted areas at high velocity, without requiring the impulsion of an excessive volume of air for the cleaning of the threshed and screened material. Chaff and other light and worthless material are carried by the air-current forwardly, axially of the rotor, about the inner edges of the ring-sectors 75, and between the front portions of the grating-bars 79, to join with the straw and like material for ejection through the main discharge-conduit 32. The grain which has been fully threshed and loosened from chaff or other light material, being of maximum weight proportional to its wind-resistance, will be least affected by the axially moving air-current, and will pass outward transversely of said air-current and radially of the rotor, between the plate-portions 73, to be received between the shroud 67 and ring-sectors 78, and thereby directed into the annular grain-collecting channel 29. Grain which has been incompletely loosened from chaff, thus having a greater wind-resistance than the clean grain, will be deflected forwardly by the air-current, sufficiently to cause such portions of the material to be received between the ring-sectors 75 and 78, and thereby directed into the annular tailings-channel 28. In said channel 28 the material is impelled by the tongues 62 of the main impeller-blades, and is expelled from the channel at the tangential nipple 114, whence it is returned to the feed-hopper through the conduit 116. The cleaned grain from the channel 29 is discharged through the tangential nipple 115 and conduit 117, by which it is delivered wherever desired. The channels 27 and 30 have no material delivered directly into them, these channels serving merely as guard-channels to receive and conserve any of the material which may escape laterally from the respective channels 28 and 29, and causing said materials to be carried respectively to the discharge-nipples 114 and 115.

Reviewing the operation of the mechanism, it will be seen that some threshing effect upon the grain will result from the impulsion of the material through the feed-trough by the feed-worm; that a further threshing effect will result from the action of the spiral flange 42 and ribs 54 when pushing the material outwardly into the space between the threshing-plates 81 and 83; and that, after passing between the threshing-plates, a final threshing effect upon the material will result from the rubbing or scouring action to which the material is subjected while traversing the space between the rotor-grating 79—80 and the retaining-plate 95. It will be seen further, that separation of the threshed material may commence while the material is passing between the plates 81 and 83, as the loosened grain may enter the channels between the ribs 82 on the plates 81, thus being rearward of the layer of straw and the like, and as the material is deflected forwardly by the cupped ring 97 any grain from between the ribs 82 will be at the outer side of the layer of straw, and thus ready to immediately pass through the rotor-grating upon leaving the outer edge of said ring 97. Because of the conical form of the rotor-screen and grating, and the delivery and distribution of the threshed material at the small axial terminus of the frusto-conical grating-surface, the layer of material passing to the forward and larger axial terminus of said surface must constantly expand in area and become more attenuated, thus tending to spread apart the straws and the like, and facilitate the passage of the loosened grain between the straws and into the openings of the grating. Because of its centrifugal impulsion, the movement of the material through the separating devices will be vastly more rapid than if the movement were dependent upon the force of gravity. Assuming, for example, that rotation of the main-shaft is at the rate of five hundred revolutions per minute, then the centrifugal or outward impulsive force of any particle of material moving with the rotor at a radius of fifteen inches will be over one hundred times the weight of the particle. Obviously such a powerful impulsive force results in imparting a high velocity to the material, so that a relatively large quantity of the material may be passed through the machine in a given time, without causing choking, overloading or massing of the material, or impairing the efficiency of separation. As the movement of materials through the machine is effected independently of gravitational forces, any tilting or change of position of the mechanism relative to a horizontal plane will have no appreciable effect upon the operation thereof. As the air-currents, by which the winnowing and cleaning of the grain is effected, are also produced centrifugally, whereby the force and velocity of the air-currents are constantly proportional to the speed of the rotor, it will be seen the winnowing or cleaning operation will not be appreciably altered by variations of speed of the rotor throughout a comparatively wide range, since the variations of speed will affect equally the velocity of the solid materials and of the air-currents by which the solids are deflected from direct radial paths, so that the separation of the materials having different wind-resistance will be produced in substantially the same degree at all speeds.

Because the operation thereof is independent of gravitational force, the mechanism provided by my invention is especially suitable for use in combines, or combined harvesting, threshing and separating machines, to enable use of such machines on hilly, rolling or sloping ground without the necessity of levelling devices to compensate for variations from level of the ground-surface traversed by the machine. As it is difficult or impracticable to maintain uniform speed of the separating mechanism in combines, except by the use of a separate motor for said mechanism, the use of my invention enables the elimination of a separate motor therefor, because of the operability of my mechanism efficiently throughout a wide variation of speed. Also, by reason of its large capacity relative to its size and weight, the use of my improved structure in a combine will materially reduce the size and weight of the combine as a whole, in comparison with combines employing ordinary gravity separation, and the reduction of size and weight will enable operation of the combine with a minimum expenditure of power.

Now, having described my invention, what I claim and desire to secure by Letters Patent is:

1. In a machine of the class described, a housing having a plurality of annular collecting-channels, discharge conduits extending tangentially from said channels, a rotor inclosed by said housing and including a plurality of impeller-blades each having axially spaced portions registering with the several collecting-channels, an annular screen-structure carriage by said rotor and arranged radially inward from the outer portions of said impeller-blades, a pair of ribbed annular plates carried respectively by the housing and upon the rotor inwardly of the screen-structure and adapted to deliver threshed material within the screen-structure at an axial terminus thereof, the screen-structure having radial passages through which materials entering the same are impelled centrifugally toward some of said collecting-channels, and means for controlling axial movement of material within the screen-structure toward another of said collecting-channels.

2. In a machine of the class described, a housing having a plurality of axially-spaced annular collecting-channels, discharge-conduits extending from said channels, a rotor mounted revolubly in said housing and having impeller-blades arranged for cooperation with said annular channels to impel materials centrifugally thereto and therein, an annular screen-structure mounted upon the rotor and extending circumferentially intermediate said impeller-blades, said housing having a feed-passage opening to said rotor centrally at one side thereof, means for impelling materials through said feed-passage to engage the rotor, cooperant annular members upon the rotor and upon the housing about said feed-passage, said members adapted to thresh material received from the feed-passage and to deliver the threshed material distributively within the annular screen-structure, the latter having radial passages for movement of centrifugally impelled material toward some of said collecting-channels, and means controlling axial movement of the material within the screen-structure toward another of said collecting-channels.

3. In a mechanism of the class described, a main housing, a main shaft journaled therein; a rotor mounted fixedly on said main shaft and comprising a central circular plate having upon the face thereof ribs curving spirally backward with respect to the direction of rotation of the plate, an annular threshing element carried on the circular plate outwardly of said spiral ribs, and an annular centrifugal separating and impelling structure disposed outwardly of said threshing element; there being a feed-opening in the main housing adjoining the ribbed central portion of the rotor, an annular threshing element adjustably mounted on the housing about said feed-opening adjacent to the threshing element on the rotor, rotary conveying means mounted coaxially with the main shaft and extending into said feed-opening, a spiral feed element carried by said rotary conveying means, said spiral element arranged adjacent to and curved oppositely in direction to the spiral ribs on the central plate of the rotor, and driving means for rotating said conveying means and feed element oppositely to the main shaft and the rotor.

4. Grain separating mechanism, comprising an annular screen structure having radial passages, means for delivering threshed material within said annular screen structure, means for rotating the screen structure to cause impulsion of grain through said radial passages, and stationary means cooperant with said rotating screen, for controlling the rate of flow of straw axially within said screen.

5. Grain separating mechanism, comprising an annular screen structure having radial passages, means for delivering threshed material within said annular screen structure, means for rotating the screen structure to cause impulsion of grain through said radial passages, and stationary means cooperant with said rotating screen, for controlling the rate of flow of straw axially within said screen, said means including an annular inner member spaced from the annular screen including a spirally pitched member attached about the outer surface thereof.

6. Grain separating mechanism comprising an annular impeller-screen structure rotatably mounted and including a series of plates having between them radially and axially extending passages, the inner surface of said screen structure being of frusto-conical form, a stationary retainer spaced inwardly from said inner frusto-conical surface, said retainer including means cooperant with said rotating frusto-conical surface for controlling the rate of flow of straw axially within said screen.

7. In a mechanism of the class described, the combination with a housing having a plurality of annular collecting channels and discharging conduits extending tangentially from said channels, of a rotor mounted revolubly in said housing and having impeller blades movable in said channels, an annular screen structure carried by said rotor and having passages extending radially and axially thereof, the inner surface of said screen structure being of frusto-conical form, means for delivering threshed material distributively onto the smaller end of said frusto-conical screen surface, a stationary member uniformly spaced inwardly from said screen surface adapted to convey grain and to prevent rebounding of the same toward the machine center, said stationary member including means controlling movement of material axially of the screen surface from the smaller end to the larger end thereof, means for forcing air axially through the passages of the screen structure, further means cooperant therewith to axially deliver some of the material which will be centrifugally impelled through said passages, toward the collecting channels.

8. In a grain threshing and separating mechanism, a housing, a rotor mounted revolubly within said housing, screening and impelling means mounted peripherally upon said rotor for delivering grain and straw centrifugally, means for delivering such material in axially spaced planes, there being in the housing annular collecting channels for receiving said materials, threshing and distributing means comprising an annular member carried by the housing and a co-acting annular member carried by the rotor and disposed inwardly of the screening means, a distributing plate including spirally arranged ribs arranged transversely of the axis of the said rotor, rotary means for feeding unthreshed material to said threshing and distributing means, said rotary means including a spirally pitched conveyor adapted to feed said material to and against said distributing plate, said conveyor being rotated oppositely to the direction of the rotation of the distributing plate.

9. In a grain threshing and separating mechanism a revoluble flat distributing plate including spirally arranged ribs, means for feeding unthreshed materials to said flat plate including a spirally pitched conveyor positioned on the axis of said plate for feeding said material to the plate, said conveyor being rotated oppositely to the direction of rotation of the plate.

10. In a grain threshing and separating mechanism a revoluble flat distributing plate including spirally arranged ribs, means for feeding unthreshed materials to said flat plate including a spirally pitched conveyor positioned on the axis of said plate for feeding said material to the plate, said conveyor being rotated oppositely to the direction or rotation of the plate, said conveyor having a broadened flange at the end adjacent said plate and spaced therefrom.

11. In a grain threshing and separating mechanism a revoluble flat distributing plate including annular outer spirally arranged ribs, means for feeding unthreshed material to said outer ribs including a spirally pitched conveyor adapted to feed said materials to and against said plate, said conveyor being rotated oppositely to the direction of said plate to cause a positive increased feeding action against said annularly spaced spiral ribs by such rotation.

12. In a grain threshing and separating mechanism a revoluble flat distributing plate including annular outer spirally arranged ribs, means for feeding unthreshed material to said outer ribs including a spirally pitched conveyor adapted to feed said materials to and against said plate, said conveyor being rotated oppositely to the direction of said plate to cause a positive increased feeding action against said annularly spaced spiral ribs by such rotation, said conveyor having a broadened flange at the end adjacent said plate for further increasing such action.

EDGAR E. METCALF.